United States Patent
Majewicz

(10) Patent No.: US 8,265,413 B2
(45) Date of Patent: Sep. 11, 2012

(54) DIGITAL IMAGE DEGRAINING FILTER AND METHOD

(75) Inventor: Peter Majewicz, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 987 days.

(21) Appl. No.: 12/260,238

(22) Filed: Oct. 29, 2008

(65) Prior Publication Data

US 2010/0021075 A1 Jan. 28, 2010

Related U.S. Application Data

(60) Provisional application No. 61/083,538, filed on Jul. 25, 2008.

(51) Int. Cl.
*G06K 9/40* (2006.01)

(52) U.S. Cl. .......... 382/261; 382/205; 382/262

(58) Field of Classification Search .......... 382/199, 382/205, 260, 261, 262, 264
See application file for complete search history.

(56) References Cited

U.S. PATENT DOCUMENTS

| | | | |
|---|---|---|---|
| 5,031,227 A | 7/1991 | Raasch et al. | 382/22 |
| 5,572,603 A | 11/1996 | Koike | 382/199 |
| 5,771,318 A | 6/1998 | Fang et al. | 382/261 |
| 5,844,627 A | 12/1998 | May et al. | 348/607 |
| 5,845,017 A | 12/1998 | Keyes | 382/261 |
| 6,226,050 B1 | 5/2001 | Lee | 348/607 |
| 6,295,382 B1 | 9/2001 | Karanovic | 382/261 |
| 6,993,191 B2 | 1/2006 | Petrescu | 382/205 |
| 7,315,646 B2 | 1/2008 | Pettigrew | 382/173 |

*Primary Examiner* — Andrew W. Johns

(57) ABSTRACT

A method of filtering and a degraining filter employ lowest edge activity (LEA) to assign a pixel value in a filtered image. A method of filtering includes selecting a set of pixels that includes a central pixel and pixels surrounding the central pixel from a digital image. The set has a plurality of subsets of pixels where at least one subset includes the central pixel. The method of filtering further includes assigning a value of a corresponding central pixel in a filtered image. The assigned value is a mean value of pixels in an identified subset of the plurality having the LEA. A degraining filter includes a processor, a memory and a computer program having instruction that implement selecting the set, identifying the subset with LEA and assigning the value.

18 Claims, 2 Drawing Sheets

DIGITAL IMAGE DEGRAINING FILTER AND METHOD

This application claims the benefit of U.S. provisional patent application Ser. No. 61/083,538, filed on Jul. 25, 2008, entitled "Digital Image Degraining Filter And Method".

BACKGROUND

Digital images, especially those that have been generated by a capture device such as, but not limited to, a scanner and a camera, contain noise that is encoded in pixels of the image. For example, imprecise electronics, photon noise, and digitization may introduce random noise (RN) during image capture. Fixed pattern noise (FPN) may be introduced by microscopic structured defects of an image sensor of the scanner or camera used to capture the digital image. Such FPN may 'beat' with various structures represented in the digital image itself resulting in moiré patterns and other distortion. Noise in images may interfere with image compression as well as printing and viewing the image. Often, the effects of noise (both RN and FPN) are described as 'grain' referring to an analogous visual quality associated with film-based images.

Image filtering, especially image smoothing is used extensively to improve an overall visual quality of digital images. In particular, image smoothing may be used to reduce effects of both RN and FPN. For example, classical mean, median, Gaussian, and LoG filters may be employed to smooth an image and reduce apparent digital image grain. However, smoothing does reduce sharpness and associated visual quality of edges in the digital image.

Various approaches have been introduced in image processing to adaptively smooth while preserving edges in the digital image. Specifically, an amount of smoothing may be adjusted in various parts of an image based on an edge content of the digital image. In other cases, edge content of the digital image may be handled differently than other aspects of the digital image during filtering. For example, smoothing may be applied to the digital image and then the edges may be re-introduced or reconstructed. Unfortunately, adaptive smoothing that preserves edges generally requires computationally intensive image processing. Such methods are generally complex and require considerable processing time to perform the adaptive smoothing. Furthermore, multi-channel images often require even more processing time as each channel is handled independently. A way of adaptively smoothing or degraining a digital image, which preserves edges, that is relatively fast and easy to implement and is applicable to multi-channel images would meet a long felt need in the area of image filtering.

BRIEF DESCRIPTION OF THE DRAWINGS

The various features of embodiments of the present invention may be more readily understood with reference to the following detailed description taken in conjunction with the accompanying drawings, where like reference numerals designate like structural elements, and in which.

DETAILED DESCRIPTION

Figure 1:
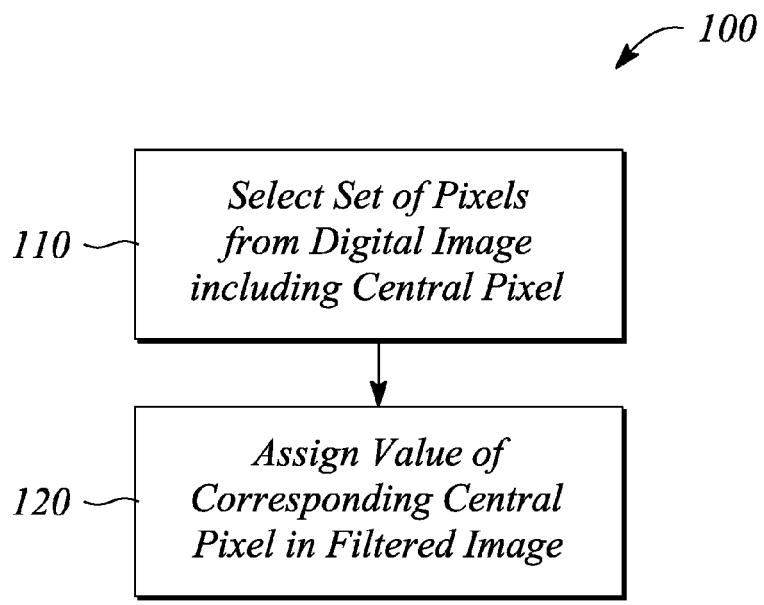
FIG. 1 illustrates a flow chart of a method of filtering a digital image, according to an embodiment of the present invention.

Embodiments of the present invention facilitate filtering an image to remove effects of noise while simultaneously preserving edges in the image. In particular, the embodiments of the present invention provide a non-linear, anisotropic, edge-preserving and adaptive smoothing filter and method of filtering digital images. Both random noise and fixed pattern noise in digital images may be reduced by the filtering, according to various embodiments of the present invention. Moreover, various embodiments of the present invention are broadly applicable to multi-channel images (e.g., color or multi-spectral digital images) and may be useful for applications that have constraints on or must deal with limited processor power.

According to various embodiments, a presence or absence of local gradients is inferred within a sliding window applied to a digital image being filtered. Local gradients are indicative of edges within the digital image and therefore provide a metric of edge density or edge activity within the window. In some embodiments, the inference is developed using only a first channel of a multi-channel or N-channel digital image. The edge activity provided by inferred local gradient information is then employed to adaptively smooth the digital image resulting in image 'degraining'. In particular, more powerful smoothing is employed in the absence of edge activity or when edge activity is relatively lower within the sliding window. Smoothing is reduced or moderated when strong local gradients indicating high edge activity are detected within the sliding window.

A speed and computational efficiency of the filtering of multi-channel digital images are maintained by employing the same or similar adaptive smoothing determined and applied to the first channel for all other channels, according to some embodiments. As such, some embodiments of the filtering of the present invention may be generally fast and simple to implement. The fast and simple implementation may make the filtering particularly useful for time critical filtering applications where computational power of a processor is limited, for example.

According to various embodiments of the present invention, filtering employs a sliding window to select a set of pixels from the digital image being filtered. For example, a three-by-three (3×3) sliding window may be employed to select a 3×3 array or set of nine pixels. In another example, the selected set comprises a five-by-five (5×5) array, which may be selected by applying a 5×5 sliding window to the digital image. Other sizes of selected sets and sliding windows including sizes that are not square may also be employed, according to some embodiments. For example, the sliding window may be a rectangular window, a round window (e.g., circular or elliptical), or an irregularly shaped window (e.g., T-shaped or random). In addition, other means of selecting a set of pixels instead of using a sliding window may be employed.

In general, the selected set comprises a central pixel and a plurality of pixels surrounding the central pixel. In some embodiments, the surrounding pixels are contiguous with the central pixels. In some embodiments, the central pixel is essentially at a physical center of an array of pixels selected by the sliding window. For example, the central pixel may be a second pixel in a second row of a 3×3 array of pixels in the selected set. In other embodiments, the central pixel is simply an identified one of the pixels within the set (e.g., second pixel in a fourth row of a 5×4 array). Moreover, reference to a 'sliding' window is merely used to indicate that the discussion of various operations on the central pixel herein is successively applied to many individual pixels in the digital image (e.g., by sliding the window across the digital image). However, the use of the term 'sliding' is not meant to limit or otherwise suggest an order or sequence with which individual central pixels are selected.

According to various embodiments, the selected set of pixels is or can be subdivided into a plurality of regions or subsets. At least one of the subsets in the plurality includes the central pixel. In some embodiments, many of the subsets include the central pixel. For example, one of the subsets may comprise all of the pixels in the selected set and thus includes the central pixel, by definition. Another exemplary subset that includes the central pixel is a quadrant subset. A 'quadrant subset', as defined herein, explicitly includes the central pixel along with pixels in a particular quadrant of the set of pixels. For example, if the selected set of pixels is represented by a 3×3 array of contiguous pixels, a quadrant subset (e.g., an upper left quadrant subset) may comprise a first pixel and a second pixel of a first row of the array, a first pixel of a second row of the array and the central pixel (i.e., the second pixel in the second row). Another example of a subset may be a border subset. A 'border subset' is defined herein as a subset that comprises pixels bordering the selected set but does not include the central pixel itself. For the exemplary set that is represented by a 3×3 array of contiguous pixels, the border subset may comprise all three pixels of the first and third rows along with a first pixel and a third pixel of the second row of the array, for example.

In various embodiments of the present invention, a level of edge activity in each of the subsets is determined and a subset having a lowest edge activity is identified. Essentially any means of determining an edge activity of a subset of pixels may be employed. For example, a directional gradient method may be applied to a subset to identify and locate edges. A density of the located edges is then determined and used to indicate edge activity of the subset. In another example, a standard deviation of pixels in the subset may be computed. The standard deviation of the pixels is proportional to an edge activity in the subset. In another example, a standard difference may be employed to infer edge activity in the subset. Once an edge activity of the subsets has been determined, the determined edge activities of the subsets are compared and a subset having a lowest edge activity is identified. The identified subset having the lowest edge activity (LEA) is referred to as an 'LEA subset', herein.

In various embodiments, a mean value of pixels in the LEA subset is then computed. The computed mean value is assigned to a corresponding central pixel in a filtered image as a value of that pixel. For example, if the central pixel is a fourth pixel in a third row of the digital image (i.e., pixel $P_{3,4}$) and the computed mean value of pixels in the LEA subset was equal to '245', then a corresponding central pixel in the filtered image (i.e., filtered image pixel $P'_{3,4}$) is assigned a value of '245'.

For a multi-channel digital image, a similar subset that is specific to a particular channel is employed to similarly assign a channel-specific corresponding central pixel value of the filtered image. The 'similar subset' is defined as a subset of pixels in another channel that has a same size, shape and location in the other channel as the LEA subset identified with respect to a first channel. Essentially, the first channel and the LEA subset of a multi-channel image are employed as a template for filtering other channels. The template identifies a similar subset in the other channels. Pixels in the similar subsets are then used to compute values of the corresponding central pixel in those other channels.

In some embodiments, the first channel is or at least represents a luminance channel of the multi-channel digital image. In multi-channel digital images that do not have an explicit luminance channel (e.g., an RGB or CYMK color image), the first channel may be a channel that best represents edges in the image. For example, a green (G) channel in an RGB color image may be used as the first channel. Alternatively, a luminance channel may be computed from the channels present in the multi-channel digital image according to known methods. The computed luminance channel is then used as the first channel. In such embodiments, filtering is applied directly to the original channels after the LEA subset has been identified in the computed luminance channel.

Herein, a 'central pixel' is defined as a pixel to which filtering is applied. The central pixel is a particular pixel in a window (e.g., a sliding window) or equivalently in a selected set of pixels from a digital image. For example, a central pixel in a 3×3 window may be a second pixel in a second row. In such an exemplary 3×3 window, the central pixel is surrounded on all sides by eight other pixels. Applying a window to a digital image, or equivalently selecting a set of pixels from a digital image, explicitly defines the central pixel so that by definition, the selected set comprises the central pixel. Furthermore, a central pixel from a first channel of a multi-channel digital image has a corresponding central pixel in each of various other channels (whether actual or computed channels) of the multi-channel digital image. In particular, when a window has been applied to select a set of pixels and define a central pixel in a first channel of a multi-channel digital image, by definition a corresponding central pixel is similarly defined in each and every other channel of the multi-channel digital image. That is, each pixel in a first channel of a multi-channel digital image has a corresponding pixel in each of the other channels.

Furthermore, 'filtering' a digital image is defined herein as comprising a one-to-one mapping of pixels from the digital image being filtered (hereinafter 'digital image') to a filtered image produced by filtering (hereinafter 'filtered image'). That is, for each pixel in the digital image there exists one and only one corresponding pixel in the filtered image. The corresponding pixel in the filtered image has a same location (i.e., same row and column) as the pixel in the digital image. For example, an i-th pixel (e.g., $P_{4,3}$) in the digital image has a corresponding i-th pixel (e.g., $P'_{4,3}$) in the filtered image. Thus and by definition herein, a 'corresponding central pixel' in a filtered image is always at a location equivalent to a location of (i.e., at a same location as) the central pixel in the digital image. Likewise, a corresponding central pixel in another channel (e.g., a second channel) is always at a same location in that other channel as the central pixel is located in the first channel.

A value of a particular pixel in the filtered image is assigned by the filtering, according to the various embodiments of the present invention. As such, the value of the particular pixel in the filtered image may differ, and generally does differ, from a value of the pixel in the digital image to which it corresponds. Also, filtering herein generally operates on or assigns values to pixels one at a time in some embodiments. In particular, the filtering operates on the central pixel of the selected set from the digital image to produce or assign a value of the corresponding central pixel of the filtered image. Hence, the central pixel of the digital image may be referred to as the pixel being filtered or to which filtering is applied while the corresponding central pixel in the filtered image is a result of the filtering.

As used herein, the terms 'multi-channel' and 'N-channel' are generally used interchangeably to refer to digital images having more than one channel. In particular, the 'N' of 'N-channel' is defined as an integer equal to or greater than one (1). Examples of multi-channel or N-channel digital images are color images using one or both of a red-green-blue (RGB) color map and a cyan-yellow-magenta-key (CYMK) color model or map. Another example of an N-channel digital image is a color image that uses the so-called YCbCr color space wherein a 'Y' channel represents a luminance, a 'Cb' channel primarily represents a blue-yellow difference and a 'Cr' channel primarily represents a red-green difference of the digital image. Various multi-spectral digital images are also multi-channel images by the definition used herein. A black and white digital image and a grayscale digital image are examples of single channel digital images. However, even a single channel digital image may be considered as an N-channel digital image where N is exactly equal to one. As such, essentially all of the discussion herein applies equally to single-channel digital images and multi-channel digital images, unless otherwise noted.

Finally, as used herein, the article 'a' is intended to have its ordinary meaning in the patent arts, namely 'one or more'. For example, 'a channel' generally means 'one or more channels' and as such, 'the channel' means 'the channel(s)' herein. Also, any reference herein to 'top', 'bottom', 'upper', 'lower', 'up', 'down', 'left' or 'right' is not intended to be a limitation herein. Moreover, examples herein are intended to be illustrative only and are presented for discussion purposes and not by way of limitation.

FIG. 1 illustrates a flow chart of a method 100 of filtering a digital image, according to an embodiment of the present invention. The method 100 of filtering essentially creates a filtered image from the digital image. In some embodiments, the filtered image replaces the digital image while in other embodiments, the digital image remains after filtering and the creation of the filtered image.

As discussed above, the filtered image is a one-to-one mapping of pixels from the digital image. The mapping includes a transformation of the mapped pixels and essentially comprises assigning values of the pixels in the filtered image based on values of one or more pixels in the digital image. In particular, the mapping operates on a succession of central pixels in the digital image and assigns values of a succession of corresponding central pixels in the filtered image. In some embodiments, the succession essentially sequentially treats each pixel of the digital image as a central pixel until all of the corresponding central pixels of the filtered image are assigned. In various embodiments, the filtered image produced by the method 100 of filtering is one or more of stored in a memory, displayed to a user, passed to another image processing operation and transmitted over a communication channel.

As illustrated in FIG. 1, the method 100 of filtering a digital image comprises selecting 110 a set of pixels from the digital image. The selected set of pixels resulting from selecting 110 comprises at least a central pixel. In some embodiments, the selected set 110 further comprises pixels surrounding the central pixel. In some of these embodiments, the surrounding pixels comprise pixels that are contiguous with the central pixel. For example, selecting 110 a set may comprises applying a rectangular window (e.g., a 3×3 window) to the digital image. When applied, the rectangular window may be centered on the central pixel, for example. In another example, the window and resulting selected set are not centered on the central pixel.

In some embodiments when the digital image is a multi-channel or N-channel digital image, selecting 110 may employ a first channel of the N-channel digital image. In some embodiments, the first channel is a luminance channel. In other embodiments, the first channel is a channel among available channels in the multi-channel digital image that either best approximates a luminance channel or has a best representation of edges. For example, a green or G-channel of an N-channel digital image that employs an RGB color map typically provides a best representation of edges. In such an example, the G-channel may be employed as the first channel. In yet other embodiments, a luminance channel not explicitly present in the N-channel digital image may be computed from the available channels and used as the first channel.

The selected set provided by selecting 110 has a plurality of subsets of pixels. In particular, the selected set may be divided into a plurality of subsets during selecting 110, in some embodiments. Dividing the selected set may be either explicit or implicit. As such, dividing the selected set may occur before, during or after selecting 110. At least one of the subsets includes the central pixel. For example, a specific subset may comprise the entire selected set and hence include the central pixel, by definition.

Figure 2:
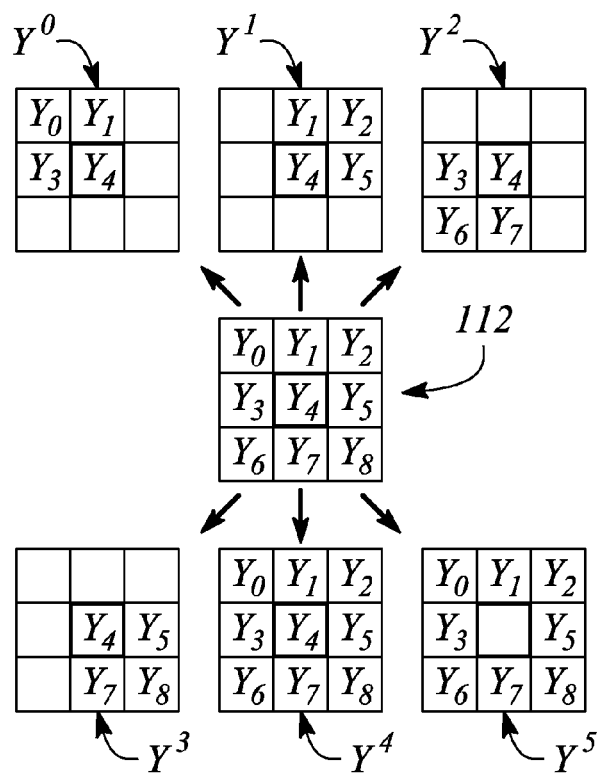
FIG. 2 illustrates an exemplary selected set of pixels along with an exemplary plurality of subsets of the selected set, according to an embodiment of the present invention.

FIG. 2 illustrates an exemplary selected set 112 of pixels along with an exemplary plurality of subsets Y of the selected set, according to an embodiment of the present invention. In particular, as illustrated in FIG. 2, the exemplary selected set 112 comprises a 3×3 array of pixels selected 110 using a rectangular (i.e., square) window. The central pixel is illustrated as a second pixel in a second row of the 3×3 array, for example. As has been discussed above, the central pixel in the selected set 112 may represent essentially any pixel in the digital image. Thus, the pixels in the selected set may be arbitrarily indexed sequentially from 0 to 8 such that the central pixel of the exemplary selected set 112 is pixel number 4 (e.g., denoted $Y_4$ in FIG. 2). The selected set 112 is illustrated as containing pixels $\{Y_0, Y_1, Y_2, Y_3, Y_4, Y_5, Y_6, Y_7, Y_8\}$.

Dividing the selected set 112 containing pixels $\{Y_0, Y_1, Y_2, Y_3, Y_4, Y_5, Y_6, Y_7, Y_8\}$ into subsets is illustrated in FIG. 2 by heavy arrows. Six (6) subsets are illustrated (denoted as '$Y^j$') in the plurality of subsets Y identified using arbitrary superscript indices j=0, 1, ..., 5 (e.g., $Y=\{Y^0, Y^2, ..., Y^5\}$). Further as illustrated, individual pixels $Y_i$ within each subset $Y^j$ are indexed using a subscript, such that a 4-th pixel (i.e., the central pixel) of the selected set 112 when considered as part of a second subset may be indicated as $Y_4^1$, for example.

A first four of the subsets, labeled $Y^0, Y^1, Y^2, Y^3$, in FIG. 2 are quadrant subsets. The quadrant subsets $Y^0, Y^1, Y^2, Y^3$, include the central pixel $Y_4$ along with pixels in one of four quadrants around the central pixel $Y_4$. For example, a first or upper left quadrant subset $Y^0$ includes first and second pixels $Y_0, Y_1$, in a first row of the exemplary 3×3 array of the selected set, a first pixel $Y_3$ in a second row of the 3×3 array and the central pixel $Y_4$. A second or upper right quadrant subset $Y^1$ includes surrounding pixels $Y_1, Y_2$, and $Y_5$ as well as the central pixel $Y_4$. Also illustrated in FIG. 2 are a subset that includes all of the pixels in the selected set $Y^4$ and a border subset $Y^5$. The illustrated border subset $Y^5$ includes only an annulus of the pixels surrounding or bordering but not including the central pixel $Y_4$. Sets of indices M of the subsets $Y^j$ may be denoted as:

$$M^0 = \{0, 1, 3, 4\}$$

$$M^1 = \{1, 2, 4, 5\}$$

$$M^2 = \{3, 4, 6, 7\}$$

$$M^3 = \{4,5,7,8\}$$
$$M^4 = \{0,1,2,K,8\}$$
$$M^5 = \{0,1,2,3,5,6,7,8\} \quad (1)$$

where the superscripts correspond to superscripts of corresponding subsets $Y^j$.

Referring again to FIG. 1, the method 100 of filtering further comprises assigning 120 a value of a corresponding central pixel in a filtered image. As has been discussed above, the corresponding central pixel in the filtered image is a pixel at a location in the filtered image that corresponds to a location in the digital image of the central pixel, which was included in the selected set. The value that is assigned 120 is a mean value of pixels in a subset of the plurality of subsets, which is identified as having a lowest edge activity among all of the subsets. In other words, the subsets of the plurality are examined and the subset with the lowest edge activity is identified. A mean value of the pixels in the identified subset is then computed. The value of the corresponding central pixel in the filtered image is then assigned 120 a value equal to the computed mean value.

In some embodiments, a standard difference of pixels in a subset is employed as a metric to assess edge activity of the subset. In some of these embodiments, the standard difference is a weighted standard difference. In other embodiments, metrics including, but not limited to, standard deviation and determining edge density using gradients within the subsets may be employed to assess edge activity thereof.

In some embodiments, the weighted standard difference $S^j$ for a j-th subset $Y^j$ is given by equation (2) as $$S^j = \sum_i \left[ \mathrm{abs}\left(\overline{Y^j} - Y_i^j\right) \cdot W^j \right] \quad (2)$$

where the pixel index $i \in M^j$, $W^j$ is a j-th weight in a vector of weights, and a function $\mathrm{abs}(\cdot)$ returns an absolute value of its argument. An exemplary weight vector W that may be employed for a selected set represented by a 3×3 array is given by equation (3)

$$W = \{7,7,7,7,1,2\} \quad (3)$$

where $W^5$ is equal to '2', for example.

Once the weighted standard differences S are computed for each of the subsets $Y^j$, an index k of the subset having the lowest edge activity may be computed according to equation (4)

$$k = \underset{j}{\mathrm{argmin}}(S^j) \quad (4)$$

which essentially determines which of the j weighted standard differences $S^j$ has the smallest value and then returns the index of that weighted standard difference (e.g., if $S^2$ is the smallest of all $S^j$, then k=2).

Once the subset having the lowest edge activity has been identified (e.g., once the index k is known), a mean value $\overline{Y^k}$ of the pixels in that subset may be computed. The computed mean value $\overline{Y^k}$ is then assigned 120 to the corresponding central pixel of the filtered image. For example, the value may be assigned 120 according to equation (5) as $$Y'_4 = \overline{Y^k} \quad (5)$$

where the corresponding central pixel of the filtered image is $Y'_4$.

In some embodiments wherein the digital image is an N-channel digital image, the identified subset from the first channel is used to identify a corresponding similar subset in other channels. A mean value of pixels in the identified subset for the other channel is then employed as a value of a corresponding central pixel in the other channel of the filtered image. For example, when the k-th subset $Y^k$ of the first channel is identified as having the lowest edge activity, then a corresponding k-th similar subset $C1^k$ of pixels in a second channel is similarly an identified subset for that channel. A mean value $\overline{C1^k}$ is then assigned to the corresponding central pixel $C1_4$ of the second channel. Equivalently, for other channels C2, C3, etc., the identified subsets and assignments are accomplished according to equation (6)

$$C1'_4 = \overline{C1^k}$$
$$C2'_4 = \overline{C2^k}$$
$$C3'_4 = \overline{C3^k} \quad (6)$$

etc.

As such, for an N-channel digital image where the identified subset is identified using a first channel of the N-channels, the method 100 of filtering further comprises selecting a corresponding similar subset of pixels from pixels in another channel of the N-channel digital image. The selected corresponding similar subset corresponds to the identified subset of the first channel having the lowest edge activity.

The method 100 of filtering further comprises assigning a value of a corresponding central pixel in the other channel of the N-channel filtered image. The corresponding central pixel in the other channel is a pixel that has a location in the other channel of the N-channel filtered image that corresponds to a location of the central pixel in the first channel of the N-channel digital image. The assigned value is a mean value of pixels in the selected corresponding similar subset of the other channel.

Figure 3:
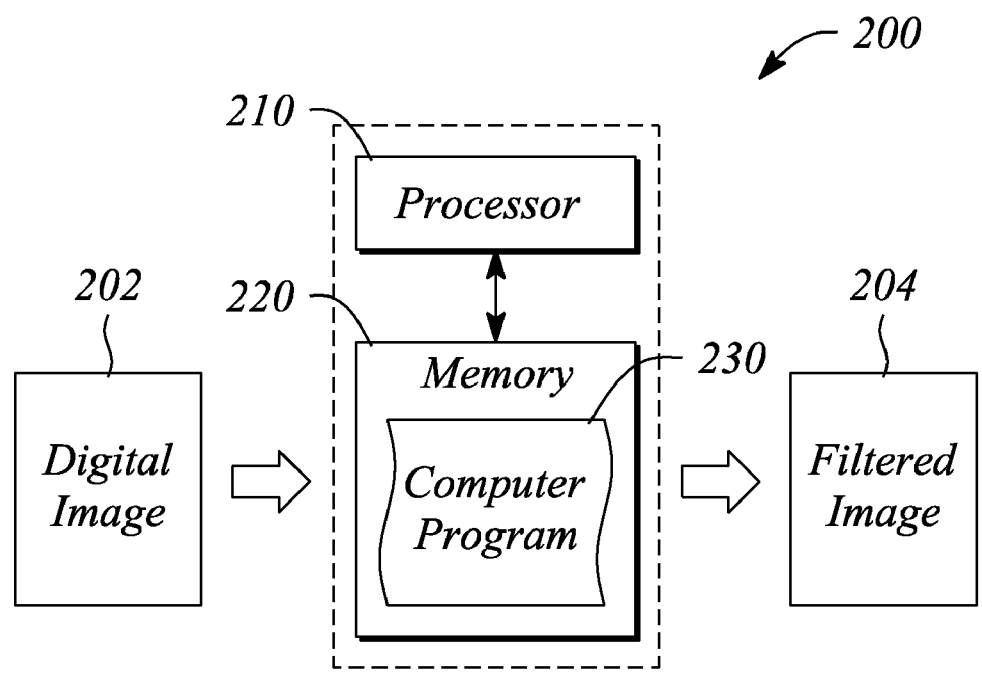
FIG. 3 illustrates a block diagram of a degraining image filter, according to an embodiment of the present invention.

FIG. 3 illustrates a block diagram of a degraining image filter 200, according to an embodiment of the present invention. The degraining image filter 200 accepts a digital image 202 and produces a filtered image 204. In some embodiments, the filtered image 204 replaces the digital image 202. In other embodiments, the digital image 202 remains after the filtered image 204 has been produced.

The degraining image filter 200 comprises a processor 210 and memory 220. For example, the processor 210 may be a central processing unit (CPU) of a general purpose computer. In another example, the processor 210 may be an embedded processor, microprocessor, or CPU in a device including, but not limited to, a scanner, a printer and a camera. In yet another example, the processor 210 may be a specialized processor such as, but not limited to, an image processor.

The memory 220 may any memory that may be accessed by the processor 210. For example, the memory 220 may be random access memory (RAM), read only memory (ROM), a magnetic or optical drive (e.g., computer hard disk) or another disk drive of a general purpose computer that either includes or is connected to the processor 210. In another example, the memory 220 comprises removable media including, but not limited to, floppy disk, a compact disk (CD), a digital versatile disk (DVD), and a memory card (e.g., a USB flash drive). In some embodiments, one or both of the processor 210 and the memory 220 are implemented as an application specific integrated circuit (ASIC).

The degraining image filter 200 further comprises a computer program 230. The computer program 230 is stored in the memory 220. For example, the computer program 230 may be implemented as a set of C/C++ language instructions. Instructions of the computer program 230, when executed by the processor 210, implement selecting a set of pixels from a digital image. The selected set comprises a central pixel and surrounding pixels contiguous with the central pixel. Additionally, the selected set has a plurality of subsets of pixels, where at least one subset includes the central pixel.

The instructions further implement identifying which subset of the plurality has a lowest edge activity and assigning a value to a central pixel in a filtered image. The assigned value is a mean value of pixels in the identified subset. In some embodiments, the instructions further implement determining a weighted standard difference for each subset in the plurality of subsets, where a subset having a lowest weighted standard difference is the identified subset. In some of these embodiments, the weighted standard difference is implemented according to equation (2) above.

In some embodiments, the computer program 230 comprises instructions, that when executed, essentially implement the method 100 of filtering described above. For example, the plurality of subsets may comprise four quadrant subsets, a border subset, and a subset that includes all of the pixels in the set of pixels. In another example, the selected set comprises a 3×3 array of pixels.

In some embodiments where the digital image is a multi-channel digital image having a plurality of channels, the instructions that implement selecting a set of pixels, determining a weighted standard difference and assigning a value to a central pixel in a filtered image are applied to a first channel of the plurality of channels that corresponds to a luminance channel. A subset of pixels from pixels in the first channel is identified. The subset has a lowest edge activity. The computer program further comprises instructions that implement selecting a similar subset of pixels from a second channel of the plurality of channels. The selected similar subset corresponds to the identified subset of the first channel. In some of these embodiments, the instructions further implement assigning a value to a central pixel in the second channel of the filtered image. The assigned value being a mean value of pixels in the selected similar subset of the second channel.

Thus, there have been described embodiments of a method of image filtering and a degraining filter that employ a lowest edge activity subset to produce a value of a corresponding central pixel in a filtered image. It should be understood that the above-described embodiments are merely illustrative of some of the many specific embodiments that represent the principles of the present invention. Clearly, those skilled in the art can readily devise numerous other arrangements without departing from the scope of the present invention as defined by the following claims.

What is claimed is:

1. A method of filtering a digital image, the method comprising:
   selecting a set of pixels from the digital image, the set comprising a central pixel and pixels surrounding the central pixel, the set having a plurality of subsets of pixels, at least one subset including the central pixel; and
   assigning a value of a corresponding central pixel in a filtered image, the assigned value being a mean value of pixels in an identified subset of the plurality, the identified subset having a lowest edge activity;
   wherein the filtered image is one or more of stored in a memory, displayed to a user, passed to another image processing operation and transmitted over a communication channel, and wherein selecting a set of pixels employs a three-by-three window centered on the central pixel that has eight pixels surrounding the central pixel.

2. A method of filtering a digital image, the method comprising:
   selecting a set of pixels from the digital image, the set comprising a central pixel and pixels surrounding the central pixel, the set having a plurality of subsets of pixels; and
   assigning a value of a corresponding central pixel in a filtered image, the assigned value being a mean value of pixels in an identified subset of the plurality, the identified subset having a lowest edge activity;
   wherein the filtered image is one or more of stored in a memory, displayed to a user, passed to another image processing operation and transmitted over a communication channel, and wherein the plurality of subsets includes four quadrant subsets, a border subset and a subset that includes all of the pixels in the selected set.

3. A method of filtering a digital image, the method comprising:
   selecting a set of pixels from the digital image, the set comprising a central pixel and pixels surrounding the central pixel, the set having a plurality of subsets of pixels, at least one subset including the central pixel; and
   assigning a value of a corresponding central pixel in a filtered image, the assigned value being a mean value of pixels in an identified subset of the plurality, the identified subset having a lowest edge activity;
   wherein the filtered image is one or more of stored in a memory, displayed to a user, passed to another image processing operation and transmitted over a communication channel, and wherein the identified subset having the lowest edge activity is the subset of the plurality having a lowest weighted standard difference.

4. The method of filtering of claim 3, wherein the digital image has N-channels and the filtered image has corresponding N-channels, the identified subset being identified using a first channel of the N-channels, the method further comprising:
   selecting a similar subset of pixels from another channel of the N-channels, the selected similar subset corresponding to the identified subset of the first channel; and
   assigning a value of a central pixel in the other channel of the filtered image, the assigned value being a mean value of pixels in the selected similar subset of the other channel.

5. A method of filtering a digital image, the method comprising:
   selecting a set of pixels from the digital image, the set comprising a three-by-three array of pixels including a central pixel, the set having a plurality of subsets of pixels, at least one subset including the central pixel;
   identifying a subset of the plurality that has a lowest edge activity; and
   assigning a value of a corresponding central pixel in a filtered image, the assigned value being a mean value of pixels in the identified subset,
   wherein the filtered image is one or more of stored in a memory, displayed to a user, passed to another image processing operation and transmitted over a communication channel.

6. The method of filtering of claim 5, wherein the plurality of subsets comprises at least a border subset that includes only eight pixels that surround the central pixel and a subset that includes all of the pixels in the selected set.

7. The method of filtering of claim 6, wherein the plurality of subsets further comprise four quadrant subsets, each quadrant subset including the central pixel.

8. The method of filtering of claim 5, wherein identifying a subset of the plurality has a lowest edge activity comprises:
computing a weighted standard difference for each of the subsets; and
determining which subset has a lowest weighted standard difference,
wherein the subset with the lowest weighted standard difference is the identified subset having the lowest edge activity.

9. The method of filtering of claim 8, wherein computing a weighted standard difference uses a relationship $$S^j = \sum_i \left[ \text{abs}(\overline{Y^j} - Y_i^j) \cdot W^j \right]$$

where $S^j$ is a j-th weighted standard difference, $Y_i^j$ is an i-th pixel value in a j-th subset $Y^j$, $\overline{Y^j}$ is a mean of all pixels in the j-th subset $Y^j$, and $W^j$ is a weight vector W with j weights, j being an integer equal to a number of subsets in the plurality.

10. The method of filtering of claim 9, wherein j is equal to six and the weight vector W is given by

W={7,7,7,7,1,2}.

11. The method of filtering of claim 5, wherein the digital image has a plurality of channels, the filtered image having a corresponding plurality of channels, and wherein selecting a set of pixels, identifying a subset and assigning a value are performed on a first channel of the plurality of channels to produce a first channel of the filtered image, the method further comprising:
selecting a similar subset of pixels from a second channel of the plurality of channels, the similar subset of the second channel corresponding to the identified subset of the first channel; and
assigning a value to a central pixel in the second channel of the filtered image, the assigned value being a mean value of pixels in the selected similar subset of the second channel.

12. The method of filtering of claim 11, wherein the first channel is a luminance channel.

13. A degraining image filter, comprising:
a processor;
a memory; and
a computer program stored in the memory, the computer program having instructions that when executed by the processor implement:
selecting a set of pixels from a digital image, the set comprising a central pixel and surrounding pixels contiguous with the central pixel, the set having a plurality of subsets of pixels, at least one subset including the central pixel;
identifying a subset of the plurality that has a lowest edge activity;
assigning a value to a central pixel in a filtered image, the assigned value being a mean value of pixels in the identified subset; and
determining a weighted standard difference for each subset in the plurality of subsets, a subset having a lowest weighted standard difference being the identified subset.

14. The degraining image filter of claim 13, wherein the instructions that implement determining a weighted standard difference use a relationship $$S^j = \sum_i \left[ \text{abs}(\overline{Y^j} - Y_i^j) \cdot W^j \right]$$

where $S^j$ is a j-th weighted standard difference, $Y_i^j$ is an i-th pixel value in a j-th subset $Y^j$, $\overline{Y^j}$ is a mean of all pixels in the j-th subset $Y^j$, and $W^j$ is a weight vector W with j weights, j being an integer equal to a number of subsets in the plurality.

15. A degraining image filter, comprising:
a processor;
a memory; and
a computer program stored in the memory, the computer program having instructions that when executed by the processor implement:
selecting a set of pixels from a digital image, the set comprising a central pixel and surrounding pixels contiguous with the central pixel, the set having a plurality of subsets of pixels;
identifying a subset of the plurality that has a lowest edge activity; and
assigning a value to a central pixel in a filtered image, the assigned value being a mean value of pixels in the identified subset;
wherein the plurality of subsets comprises four quadrant subsets, a border subset, and a subset that includes all of the pixels in the set of pixels.

16. A degraining image filter, comprising:
a processor;
a memory; and
a computer program stored in the memory, the computer program having instructions that when executed by the processor implement:
selecting a set of pixels from a digital image, the set comprising a central pixel and surrounding pixels contiguous with the central pixel, the set having a plurality of subsets of pixels, at least one subset including the central pixel;
identifying a subset of the plurality that has a lowest edge activity; and
assigning a value to a central pixel in a filtered image, the assigned value being a mean value of pixels in the identified subset;
wherein the selected set comprises a three-by-three array of pixels.

17. A degraining image filter, comprising:
a processor;
a memory; and
a computer program stored in the memory, the computer program having instructions that when executed by the processor implement:
selecting a set of pixels from a digital image, the set comprising a central pixel and surrounding pixels contiguous with the central pixel, the set having a plurality of subsets of pixels, at least one subset including the central pixel;
identifying a subset of the plurality that has a lowest edge activity; and
assigning a value to a central pixel in a filtered image, the assigned value being a mean value of pixels in the identified subset
wherein the digital image has a plurality of channels, the filtered image having a corresponding plurality of channels, and wherein the instructions that implement selecting a set of pixels, identifying a subset and assigning a value are applied to a first channel of the plurality of channels, and wherein the computer program further comprises instructions that implement:

selecting a similar subset of pixels from a second channel of the plurality of channels, the similar subset of the second channel corresponding to the identified subset of the first channel; and assigning a value to a central pixel in the second channel of the filtered image, the assigned value being a mean value of pixels in the selected similar subset of the second channel.

18. The degraining image filter of claim 17, wherein the first channel is a luminance channel.

* * * * *